United States Patent [19]
Min

[11] Patent Number: 5,930,025
[45] Date of Patent: *Jul. 27, 1999

[54] ARRAY OF THIN FILM ACTUATED MIRRORS AND METHOD FOR THE MANUFACTURE THEREOF

[75] Inventor: Yong-Ki Min, Seoul, Rep. of Korea

[73] Assignee: Daewoo Electronics Co., Ltd., Seoul, Rep. of Korea

[*] Notice: This patent is subject to a terminal disclaimer.

[21] Appl. No.: 08/858,885

[22] Filed: May 19, 1997

[30] Foreign Application Priority Data

May 29, 1996 [KR] Rep. of Korea ...................... 96-18392
May 29, 1996 [KR] Rep. of Korea ...................... 96-18393

[51] Int. Cl.⁶ .................................................. G02B 26/00
[52] U.S. Cl. ........................................... 359/291; 359/292
[58] Field of Search ....................................... 359/291, 292

[56] References Cited

U.S. PATENT DOCUMENTS 5,808,782  9/1998  Min ......................................... 359/292

FOREIGN PATENT DOCUMENTS 0712020  5/1996  European Pat. Off. .
0712021  5/1996  European Pat. Off. .
0712245  5/1996  European Pat. Off. .
9524798  9/1995  WIPO .

*Primary Examiner*—Georgia Epps
*Assistant Examiner*—Suzanne Letendre
*Attorney, Agent, or Firm*—Pennie & Edmonds LLP

[57] ABSTRACT

An inventive array of M×N thin film actuated mirrors includes an active matrix and an array of M×N actuating structures. Each of the actuating structures includes a first thin film electrode, a thin film electrodisplacive member, a second thin film electrode, an elastic member, a conduit and an insulating member. In the array, the insulating member is made of an insulating material, e.g., oxide or nitride, and is formed between top of the conduit and bottom of the first thin film electrode, thereby reducing the possibility of an electrical contact forming between the first and the second thin film electrodes.

5 Claims, 12 Drawing Sheets

ARRAY OF THIN FILM ACTUATED MIRRORS AND METHOD FOR THE MANUFACTURE THEREOF

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is illustrated a cross sectional view setting forth an array of M×N thin film actuated mirrors 100, wherein M and N are integers, disclosed in a copending commonly owned application, now U.S. Pat. No. 5,757,539, entitled "THIN FILM ACTUATED MIRROR ARRAY FOR USE IN AN OPTICAL PROJECTION SYSTEM".

The array 100 includes an active matrix 110, a passivation layer 116, an etchant stopping layer 118 and an array of M×N actuating structures 120.

The active matrix 110 includes a substrate 112, an array of M×N transistors (not shown) and an array of M×N connecting terminals 114. Each of the connecting terminals 114 is electrically connected to a corresponding transistor in the array of transistors.

The passivation layer 116, made of, e.g., a phosphor-silicate glass (PSG) or silicon nitride, and having a thickness of 0.1–2 $\mu$m, is located on top of the active matrix 110.

The etchant stopping layer 118, made of silicon nitride, and having a thickness of 0.1–2 $\mu$m, is positioned on top of the passivation layer 116.

Each of the actuating structures 120 has a distal and a proximal ends, and further includes a tip (not shown) at the distal end thereof and an etching aperture (not shown) traversing vertically therethrough. Each of the actuating structures 120 is provided with a first thin film electrode 132, a thin film electrodisplacive member 126, a second thin film electrode 124, an elastic member 122 and a conduit 128. The first thin film electrode 132 made of an electrically conducting and light reflecting material, e.g., aluminum(Al) or silver(Ag), is located on top of the thin film electrodisplacive member 126, and is divided into an actuating and a light reflecting portions 130, 140 by a horizontal stripe 134, wherein the horizontal stripe 134 disconnects electrically the actuating and the light reflecting portions 130, 140. The actuating portion 130 thereof is electrically connected to ground, thereby functioning as a mirror as well as a common bias electrode. The light reflecting portion 140 thereof functions as the mirror. The thin film electrodisplacive member 126, made of a piezoelectric material, e.g., lead zirconium titanate(PZT), or an electrostrictive material, e.g., lead magnesium niobate(PMN), is placed on top of the second thin film electrode 124. The second thin film electrode 124, made of an electrically conducting material, e.g., platinum/tantalum(Pt/Ta), is located on top of the elastic member 126, and is electrically connected to a corresponding transistor through the conduit 128 and the connecting terminal 114, wherein the second thin film layer 124 is iso-cut into an array of M×N second thin film electrodes 124 by using a dry etching method such that each of the second thin film electrodes 124 is electrically disconnected from other second thin film electrodes 124 (not shown), thereby allowing it to function as a signal electrode. The elastic member 122, made of a nitride, e.g., silicon nitride, is positioned below the second thin film electrode 124. A bottom portion at the proximal end thereof is attached to top of the active matrix 110, with the etchant stopping 118 and the passivation layers 116 partially intervening therebetween, thereby cantilevering the actuating structure 120. The conduit 128, made of a metal, e.g., tungsten(W), extends from top of the thin film electrodisplacive member 126 to top of a corresponding connecting terminal 114, thereby connecting electrically the second thin film electrode 122 to the connecting terminal 114. The conduit 128 extending downward from top of the thin film electrodisplacive member 126 and the first thin film electrode 132 placed on top of the thin film electrodisplacive member 126 in each of the thin film actuated mirrors 150 are not electrically connected to each other.

There are certain shortcomings associated with the above described array 100 of M×N thin film actuated mirrors 150, one of the shortcomings being the possible occurrence of a short-circuit between the first and the second electrodes 132, 124 in each of the actuated mirrors 150. In the array, since the conduit 128 in each of the thin film actuated mirrors 150 extends from the corresponding connecting terminals to top of the electrodisplacive member 126, an extreme care is required during patterning of the first thin film electrode 132. The first thin film electrode 132 must electrically be disconnected completely from the conduit 128 in each of the thin film actuated mirrors 150. If not, it may lead to an establishment of an electrical connection between the first thin film electrode 132 and the second thin film electrode 124, resulting in a short-circuit therebetween.

SUMMARY OF THE INVENTION

It is, therefore, a primary object of the present invention to provide an array of M×N thin film actuated mirrors, each of the thin film actuated mirrors having a novel structure capable of preventing the occurrence of the short-circuit between a first and a second electrodes.

It is another object of the present invention to provide a method for manufacture of such an array of M×N thin film actuated mirrors.

In accordance with one aspect of the present invention, there is provided an array of M×N thin film actuated mirrors, wherein M and N are integers, for use in an optical projection system, the array comprising: an active matrix; and an array of M×N actuating structures, each of the actuating structures being provided with an elastic member, a bottom portion at a proximal end thereof secured to the active matrix to thereby cantilever the elastic member, a first thin film electrode electrically connected to ground, thereby allow the first thin film electrode to function as a mirror and a bias electrode, a second thin film electrode, a conduit extending downward from top of the second thin film electrode to the active matrix for electrically connecting therebetween to thereby allow the second thin film electrode to function as a signal electrode, a thin film electrodisplacive member located between the first and the second thin film electrodes, and an insulating member, wherein the insulating member is located between top of the conduit and bottom of the first thin film electrode, thereby electrically disconnecting the first and the second thin film electrodes.

In accordance with another aspect of the present invention, there is provided a method for manufacturing an array of M×N thin film actuated mirrors, wherein M and N are integers, for use in an optical projection system, the method comprising the steps of: preparing an active matrix including a substrate and an array of M×N connecting terminals; forming a passivation layer on top of the active matrix; depositing an etchant stopping layer on top of the passivation layer; forming a thin film sacrificial layer on top of the etchant stopping layer; creating an array of M×N pairs of empty cavities in the thin film sacrificial layer in such a way that one of the empty cavities in each pair encompasses one of the connecting terminals; depositing an elastic layer, a second thin film layer and a thin film electrodisplacive layer, successively, on top of the thin film sacrificial layer including the empty cavities; patterning the electrodisplacive layer and the second thin film layer to form an array of M×N electrodisplacive members and an array of M×N second thin film electrodes; forming an array of M×N conduits, each of the conduits extending from the second thin film electrodes to top of the corresponding connecting terminal; forming an array of M×N insulating members; depositing a first thin film layer on top of the array of M×N insulating members and the thin film electrodisplacive members to thereby form a multiple layered structure; patterning the multiple layered structure into an array of M×N actuated mirror structures, until the thin film sacrificial layer is exposed; and removing the thin film sacrificial layer using an etchant or a chemical to thereby form the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
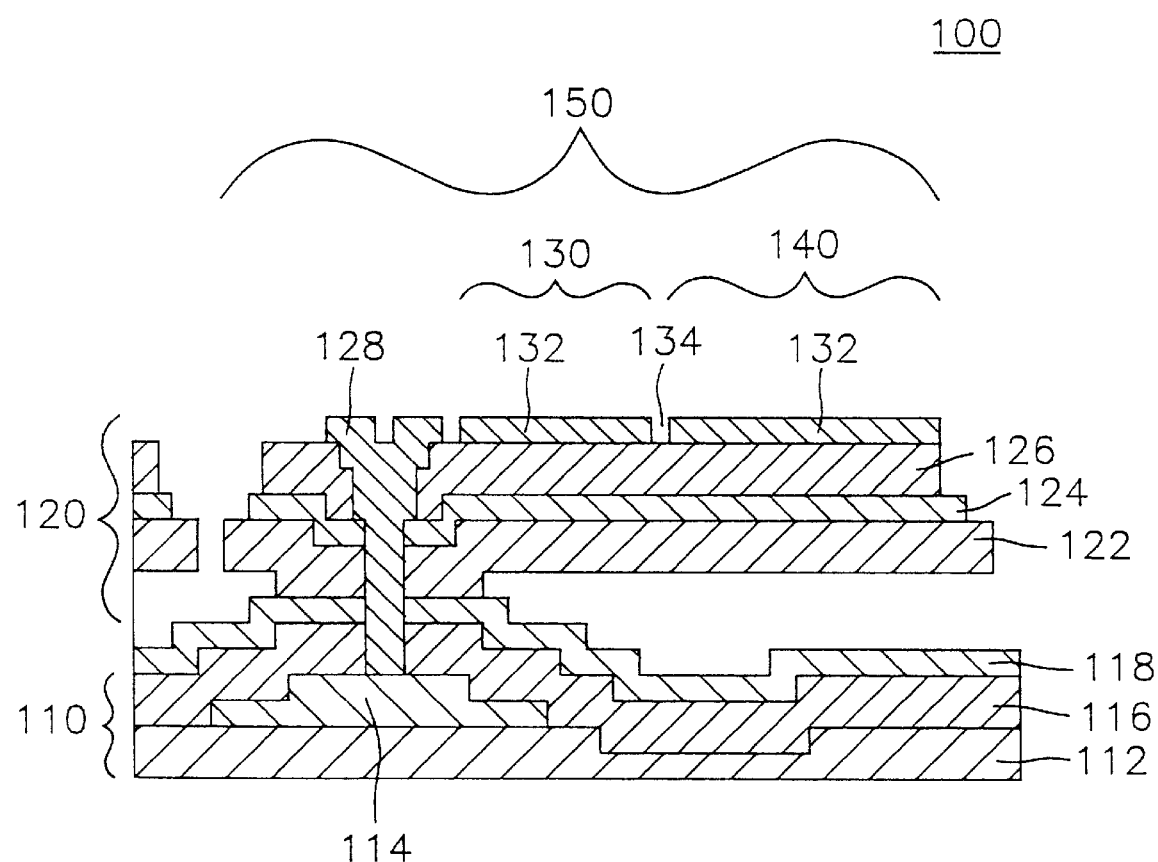
FIG. 1 is a schematic partial cross sectional view illustrating an array of M×N thin film actuated mirrors previously disclosed.
Figure 2:
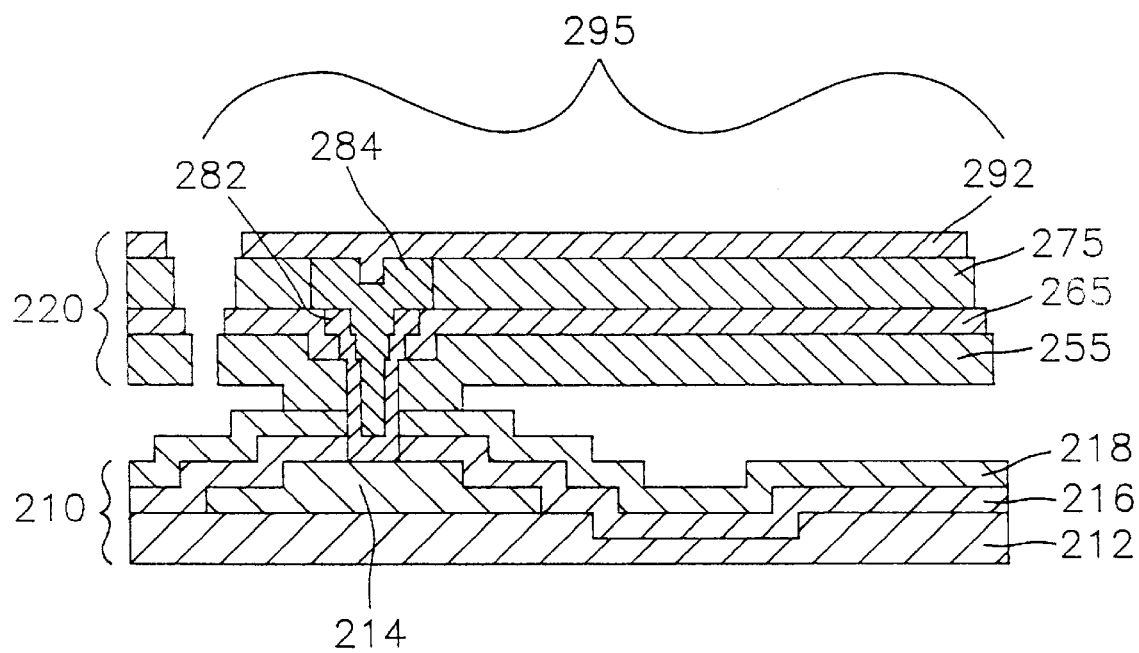
FIG. 2 depicts a partial cross sectional view setting forth an array of M×N thin film actuated mirrors in accordance with a first preferred embodiment of the present invention.
Figure 3A:
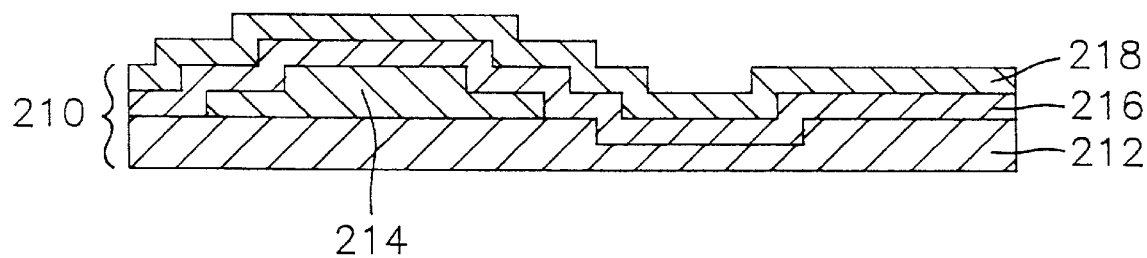
FIGS. 3A to 3M represent partial cross sectional views setting forth a method for the manufacture of an array of M×N thin film actuated mirrors shown in FIG. 2.
Figure 3B:
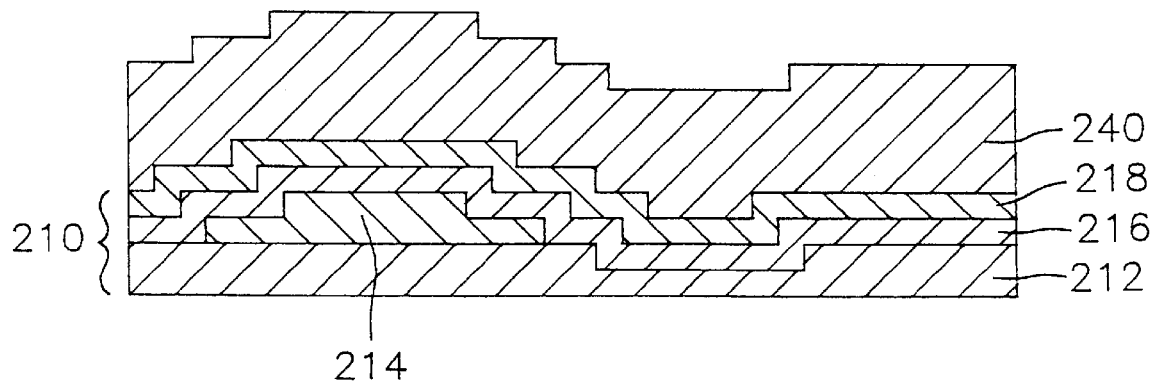
Figure 3C:
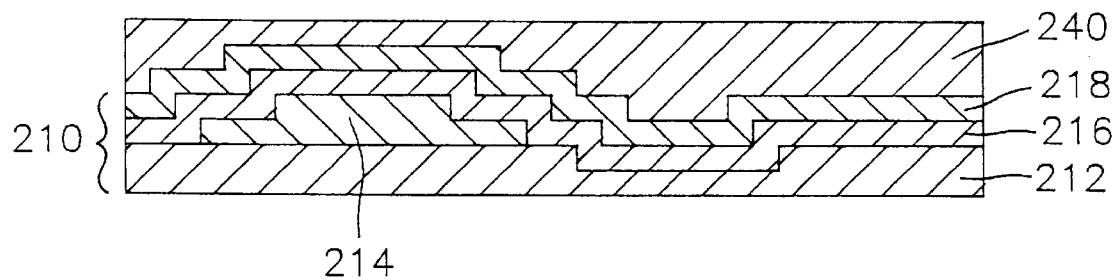
Figure 3D:
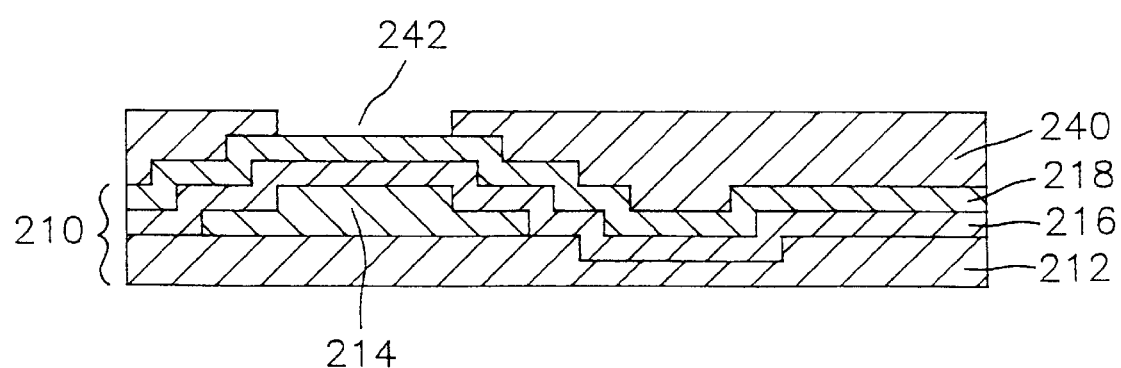
Figure 3E:
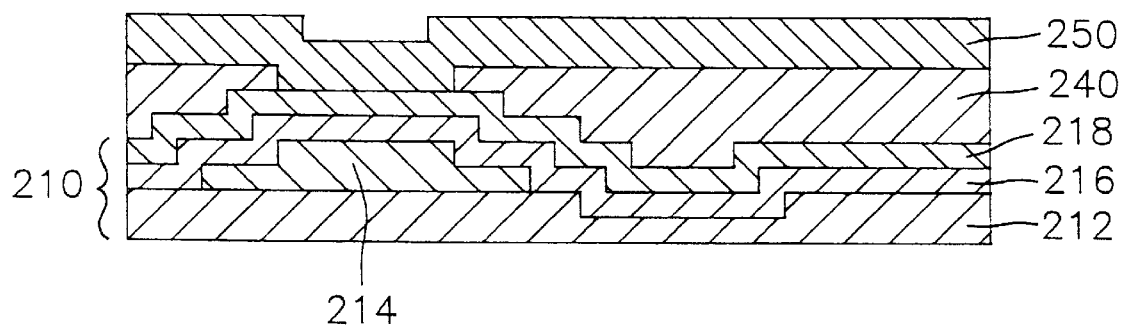
Figure 3F:
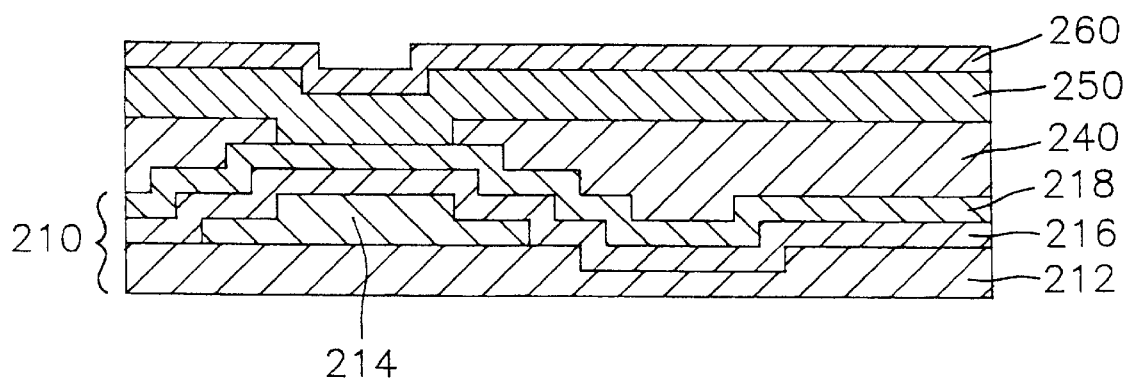
Figure 3G:
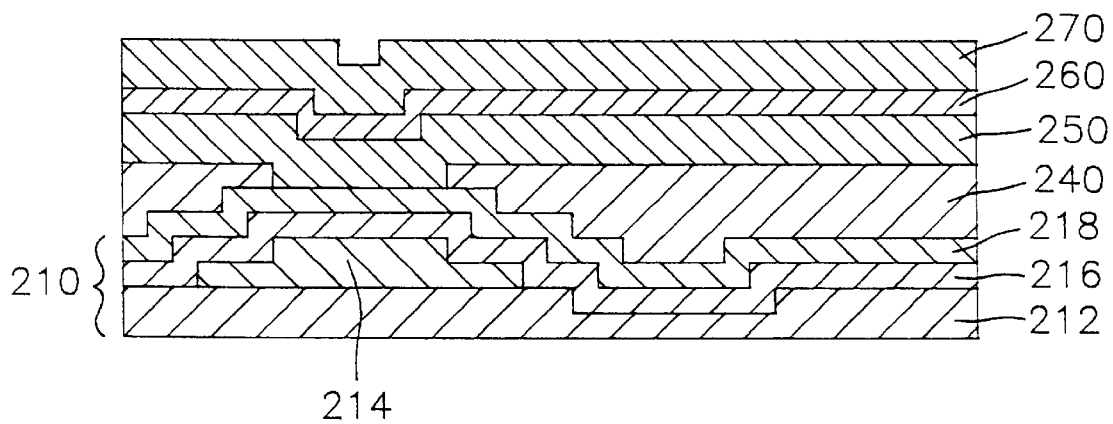
Figure 3H:
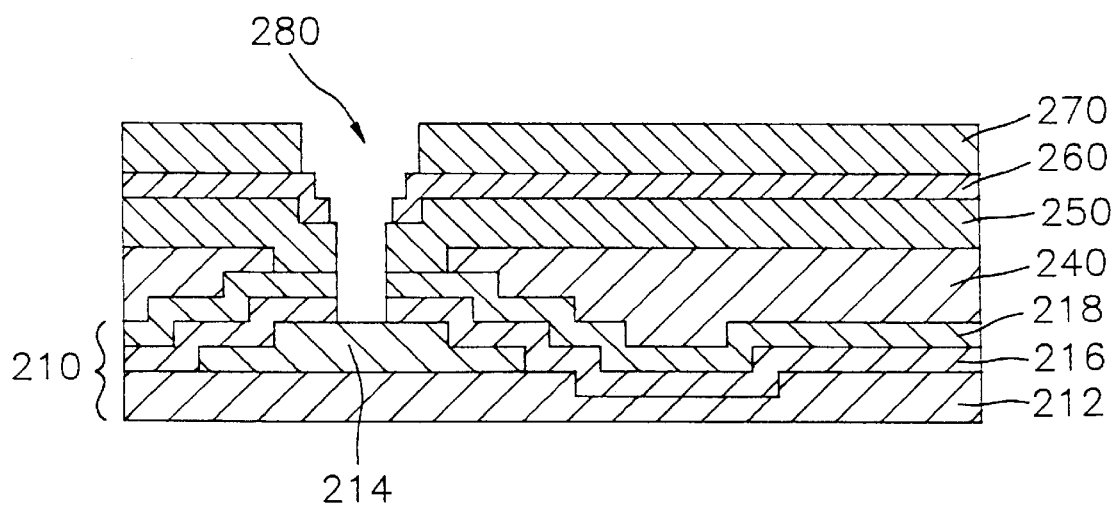
Figure 3I:
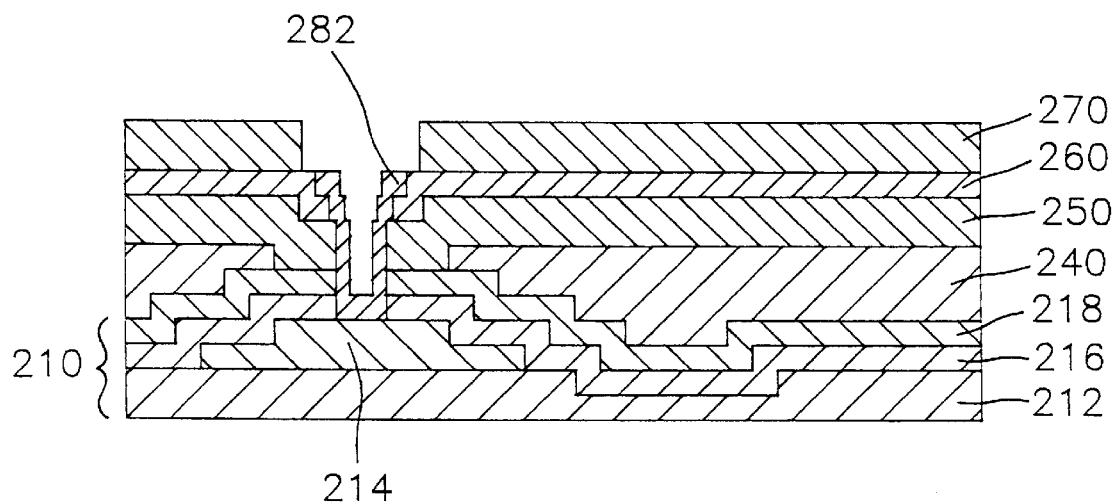
Figure 3J:
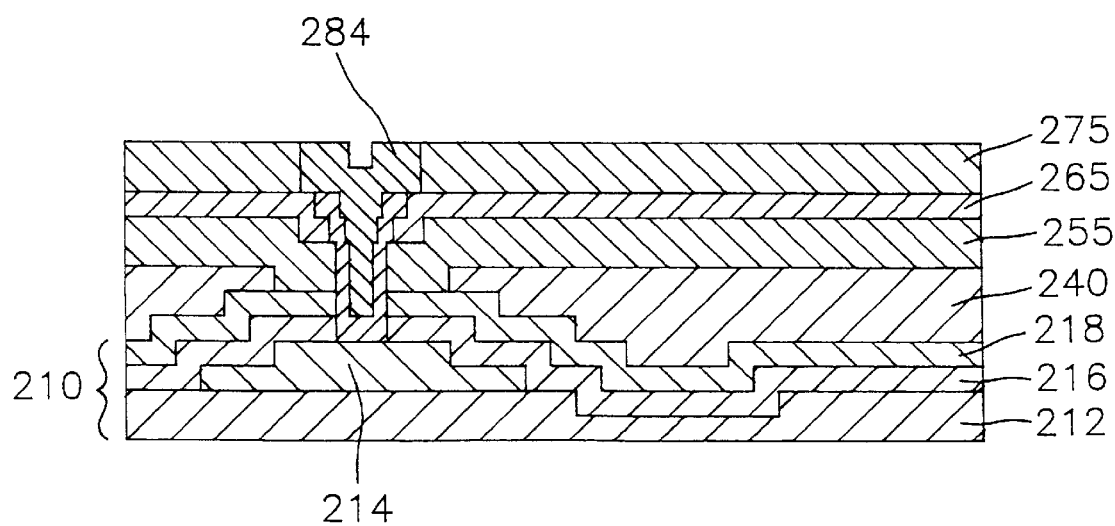
Figure 3K:
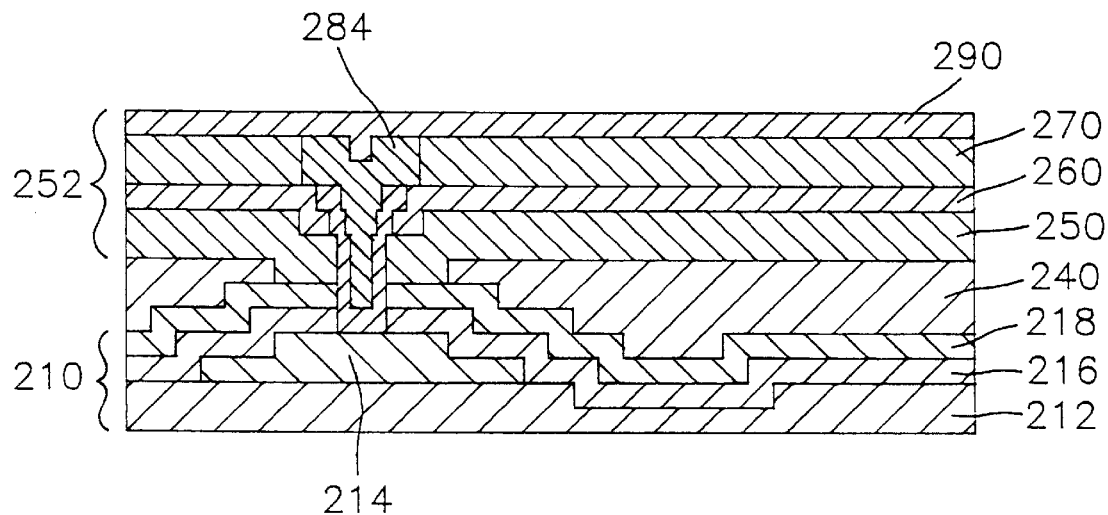
Figure 3L:
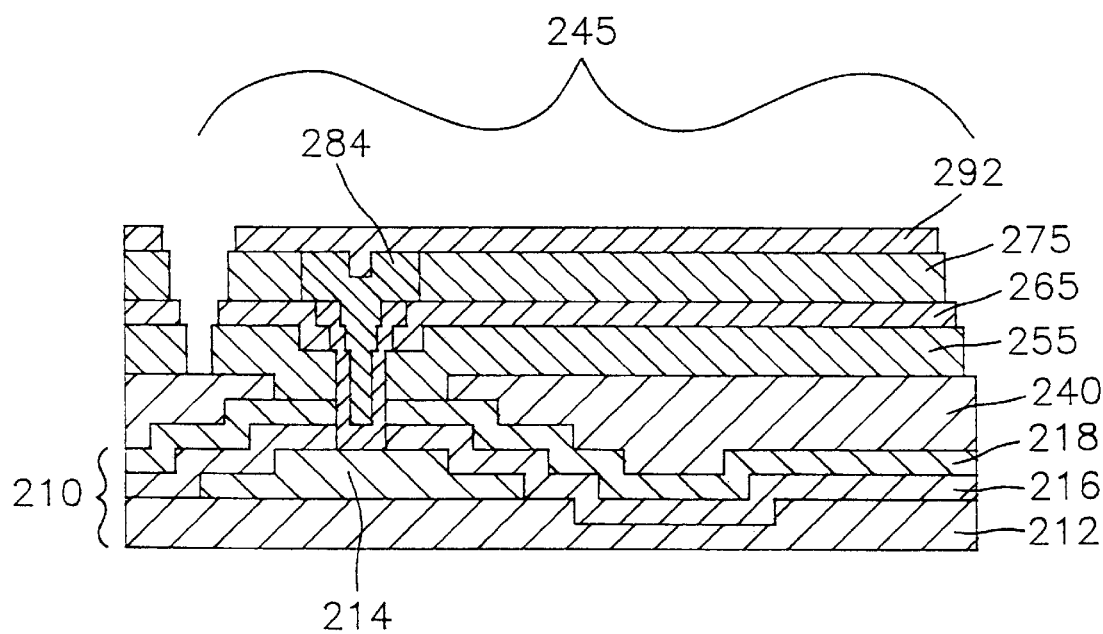
Figure 3M:
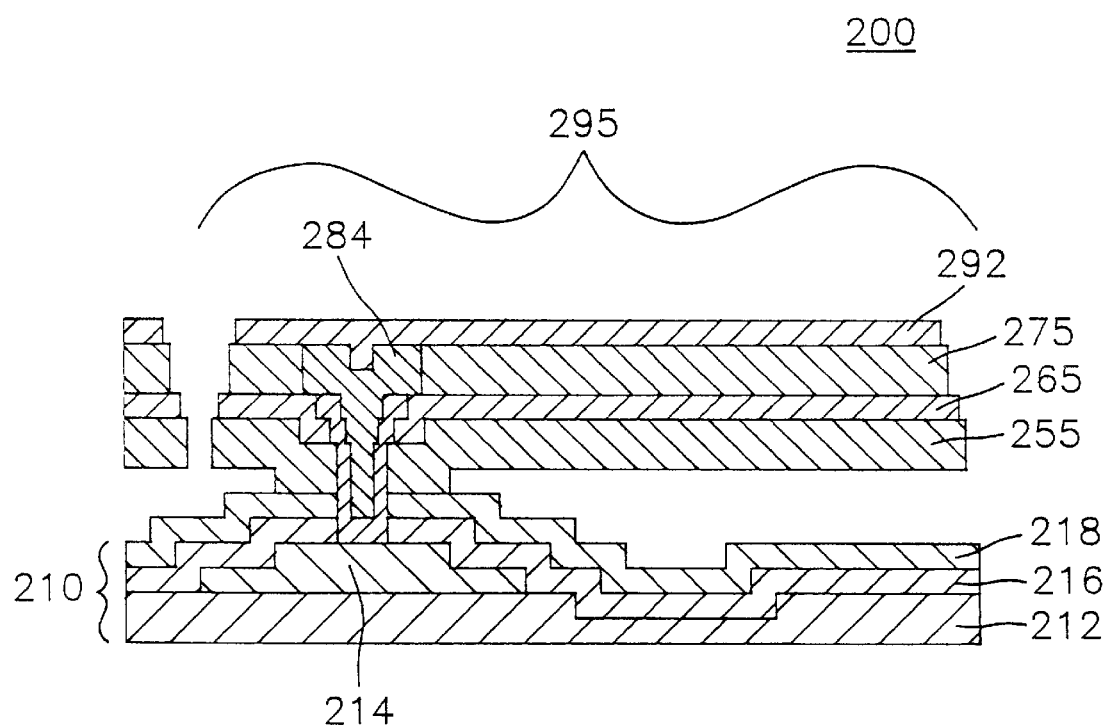
Figure 4:
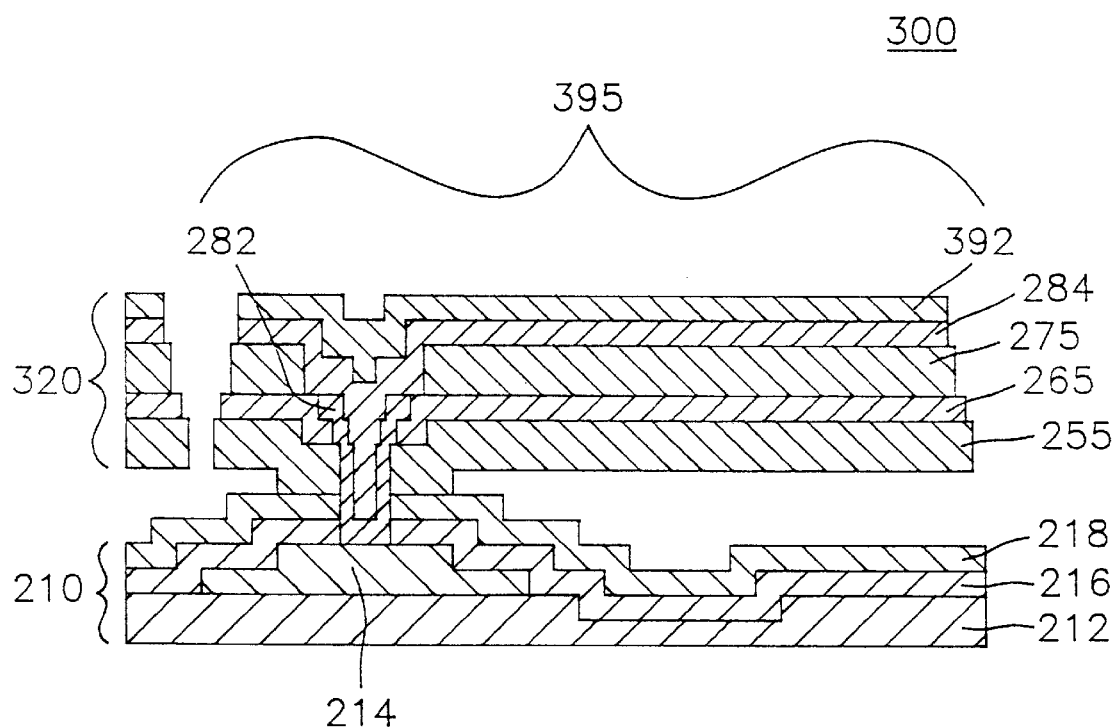
FIG. 4 illustrates a partial cross sectional view setting forth an array of M×N thin film actuated mirrors in accordance with a second preferred embodiment of the present invention.

There are provided in FIGS. 2, 4, 3A to 3M and 5A to 5D cross sectional views setting forth arrays 200, 300 of M×N thin film actuated mirrors 295, 395, wherein M and N are integers, for use in an optical projection system in accordance with a first and a second preferred embodiments of the present invention and schematic cross sectional views illustrating methods for manufacturing the arrays 200, 300 of M×N thin film actuated mirrors 295, 395, shown in FIGS. 2 and 4, respectively. It should be noted that like parts appearing in FIGS. 2, 4, 3A to 3M and 5A to 5D are represented by like reference numerals.

In FIG. 2, there is provided a cross sectional view setting forth an array 200 of M×N thin film actuated mirrors 295 in accordance with a first embodiment of the present invention, the array 200 comprising an active matrix 210 and an array of M×N actuating structures 220.

The active matrix 210 includes a substrate 212, an array of M×N transistors (not shown) and an array of M×N connecting terminals 214. Each of the connecting terminals 214 is electrically connected to a corresponding transistor in the array of transistors.

The passivation layer 216, made of, e.g., a phosphor-silicate glass(PSG) or silicon nitride, and having a thickness of 0.1–2 μm, is located on top of the active matrix 210.

The etchant stopping layer 218, made of silicon nitride, and having a thickness of 0.1–2 μm, is positioned on top of the passivation layer 216.

Each of the actuating structures 220 is provided with a first thin film electrode 292, a thin film electrodisplacive member 275, a second thin film electrode 265, an elastic member 255, a conduit 282 and an insulating member 284. The first thin film electrode 292 made of an electrically conducting and light reflecting material, e.g., aluminum(Al) or silver(Ag), is located on top of the thin film electrodisplacive member 275. The first thin film electrode 292 is electrically connected to ground, thereby functioning as a mirror as well as a common bias electrode. The thin film electrodisplacive member 275, made of a piezoelectric material, e.g., lead zirconium titanate(PZT), or an electrostrictive material, e.g., lead magnesium niobate(PMN), is located between the first and the second thin film electrodes 292, 265. The second thin film electrode 265, made or an electrically conducting material, e.g., platinum/tantalum(Pt/Ta), is located on top of the elastic member 255, and is electrically connected to a corresponding transistor through the conduit 282 and the connecting terminal 214 and is electrically disconnected from the second thin film electrode 265 in other thin film actuated mirrors 295, thereby allowing it to function as a signal electrode in each of the actuated mirrors 295. The elastic member 255, made of a nitride, e.g., silicon nitride, is positioned below the second thin film electrode 265. A bottom portion at the proximal end thereof is secured to top of the active matrix 210, thereby cantilevering the actuating structure 220. The conduit 282, made of a metal, e.g., tungsten(W), extends from top of the second thin film electrode 265 to top of the corresponding connecting terminal 214, thereby connecting electrically the second thin film electrode 265 to the connecting terminal 214. The insulating member 284 is formed between top of the conduit 282 and bottom of the first thin film electrode 292, thereby preventing the first thin film electrode 292 from electrically connected to the second thin film electrode 265.

In FIGS. 3A to 3M, there are provided partial schematic cross sectional views illustrating a method for the manufacture of the array 200 of M×N thin film actuated mirrors 295 as shown in FIG. 2.

The process for the manufacture of the array 200 begins with the preparation of an active matrix 210 including a substrate 212, an array of M×N connecting terminals 214 and an array of M×N transistors (not shown). The substrate 212 is made of an insulating material, e.g., Si-wafer. Each of the connecting terminals 214 is electrically connected to a corresponding transistor in the array of transistors. In a subsequent step, there is formed a passivation layer 216, made of, e.g., a phosphor-silicate glass(PSG) or silicon nitride, and having a thickness of 0.1–2 $\mu$m, on top of the active matrix 210 by using, e.g., a CVD or a spin coating method. Thereafter, an etchant stopping layer 218, made of silicon nitride, and having a thickness of 0.1–2 $\mu$m, is deposited on top of the passivation layer 216 by using, e.g., a sputtering or a CVD method, as shown in FIG. 3A.

Then, a thin film sacrificial layer 240 is formed on top of the etchant stopping layer 218, as shown in FIG. 3B. The thin film sacrificial layer 240 is formed by using a sputtering or an evaporation method if the thin film sacrificial layer 240 is made of a metal, a CVD or a spin coating method if the thin film sacrificial layer 240 is made of a PSG, or a CVD method if the thin film sacrificial layer 240 is made of a poly-Si.

Next, top of the thin film sacrificial layer 240 is made flat by using a spin on glass(SOG) method or a chemical mechanical polishing(CMP) method, followed by a scrubbing method, as shown in FIG. 3C.

Subsequently, an array of M×N pairs of empty cavities 242 is created in the thin film sacrificial layer 240 in such a way that one of the empty cavities 242 in each pair is aligned with one of the connecting terminals 214 by using a dry or an wet etching method, as shown in FIG. 3D.

In a next step, an elastic layer 250, made of nitride, e.g., silicon nitride, and having a thickness of 0.1–2 $\mu$m, is deposited on top of the thin film sacrificial layer 240 including the empty cavities 242 by using a CVD method, as shown in FIG. 3E. During the deposition, the stress inside the elastic layer 250 is controlled by changing the ratio of the reactant gases as a function of time.

Thereafter, a second thin film layer 260, made of an electrically conducting material, e.g., Pt/Ta, and having a thickness of 0.1–2 $\mu$m, is formed on top of the elastic layer 250 by using a sputtering or a vacuum evaporation method, as shown in FIG. 3F. The second thin film layer 260 is then iso-cut into an array of M×N second thin film electrodes 265, illustrated in FIG. 2, by using a dry etching method, wherein each of the second thin film electrodes 265 is electrically disconnected from other second thin film electrodes 265.

Then, a thin film electrodisplacive layer 270, made of a piezoelectric material, e.g., PZT, or an electrostrictive material, e.g., PMN, and having a thickness of 0.1–2 $\mu$m, is deposited on top of the array of M×N second thin film electrodes 265 by using an evaporation, a Sol-Gel, a sputtering or a CVD method, as shown in FIG. 3G. The thin film electrodisplacive layer 270 is then heat treated to allow a phase transition to take place by using a rapid thermal annealing(RTA) method.

Since the thin film electrodisplacive layer 270 is sufficiently thin, there is no need to pole it in case it is made of a piezoelectric material: for it can be poled with the electric signal applied during the operation of the thin film actuated mirrors 295.

In a subsequent step, an array of M×N holes 280 is created by using an etching method, wherein each of the holes extends from top of the thin film electrodisplacive layer 270 to top of a corresponding connecting terminal 214, as shown in FIG. 3H.

In a following step, the conduit 282 is formed by filling a portion of each of the holes 280 with a metal, e.g., tungsten(W), using, e.g., a lift-off method, in such a way that the conduit 282 is an electrical contact with the second thin film layer 260 and the corresponding connecting terminal 214, as shown in FIG. 3I.

Subsequently, an insulating member 284 is formed in the remaining portion of each of the holes 280 by filling therein with an insulating material, e.g., oxide or nitride, using a lift-off method until top of the insulating member 284 is in level with top of the thin film electrodisplacive layer 270, thereby reducing a possibility of an electrical contact forming between the second thin film electrode 265 and a first thin film layer 290 to be formed on top of the thin film electrodisplacive layer 270, as shown in FIG. 3J.

Thereafter, a first thin film layer 290, made of an electrically conducting and light reflecting material, e.g., aluminum(Al) or silver(Ag), and having a thickness of 0.1–2 $\mu$m, is formed on top of the thin film electrodisplacive layer 270 and the insulating member 284 by using a sputtering or a vacuum evaporation method, thereby forming a multiple layered structure 252, as shown in FIG. 3K.

In an ensuing step, as shown in FIG. 3L, the multiple layered structure 252 is patterned into an array of M×N semifinished actuated mirrors 245 by using a photolithography or a laser trimming method, until the thin film sacrificial layer 240 is exposed. Each of the M×N semifinished actuated mirrors 245 includes a first thin film electrode 292, a thin film electrodisplacive member 275, the second thin film electrode 265 and an elastic member 255.

The preceding step is then followed by completely covering each of the semifinished actuated mirrors 245 with a thin film protection layer (not shown).

The thin film sacrificial layer 240 is then removed by using an wet etching method using an etchant or a chemical, e.g., hydrogen fluoride(HF) vapor, thereby forming a driving space for each of the thin film actuated mirrors 295.

Next, the thin film protection layer is removed.

Finally, the active matrix 210 is completely diced into a desired shape, by using a photolithography or a laser trimming method to thereby form the array 200 of M×N thin film actuated mirrors 295, as shown in FIG. 3M.

In FIG. 4, there is provided a cross sectional view setting forth an array 300 of M×N thin film actuated mirrors 395 in accordance with a first embodiment of the present invention, the array 300 comprising an active matrix 310 and an array of M×N actuating structures 320.

There is shown in FIG. 4 a cross sectional view of a second embodiment of an array 300 of M×N thin film actuated mirrors 395, wherein the second embodiment is similar to the first embodiment except that the insulating member 284 is formed in such away that it covers top of the conduit 282 and also the thin film electrodisplacive member 275. In other words, the insulating member 284 is in a layer form and is interposed between the first thin film electrode 292 and the thin film electrodisplacive member 275, the insulating member 284 extending from the top surface of the conduit 282 to a distal end of the thin film electrodisplacive member 275. In this case, the insulating member 284 is made of an electrodisplacive ceramic material, e.g., $MZr_xTi_yO_3$, wherein M is Pb which may be partly or indeed completely replaced by one or more of Ca, Ba, Mg, Li, Cu, Ag, Au or Cd. Furthermore, $MZr_xTi_yO_3$ may also be doped with small amounts of Mg, Na, Nb, La or Zn.

Alternatively, in FIGS. 5A to 5D, there are shown partial cross sectional views illustrating a method for manufacturing the array of M×N thin film actuated mirrors in accordance with a second preferred embodiment of the present invention, wherein the steps for forming the second embodiment is identical to the steps for forming the first embodiment shown in FIGS. 3A to 3I, until it reaches the step for forming the insulating member 284 on top of the conduit 282 and the thin film electrodisplacive member 275.

Figure 5A:
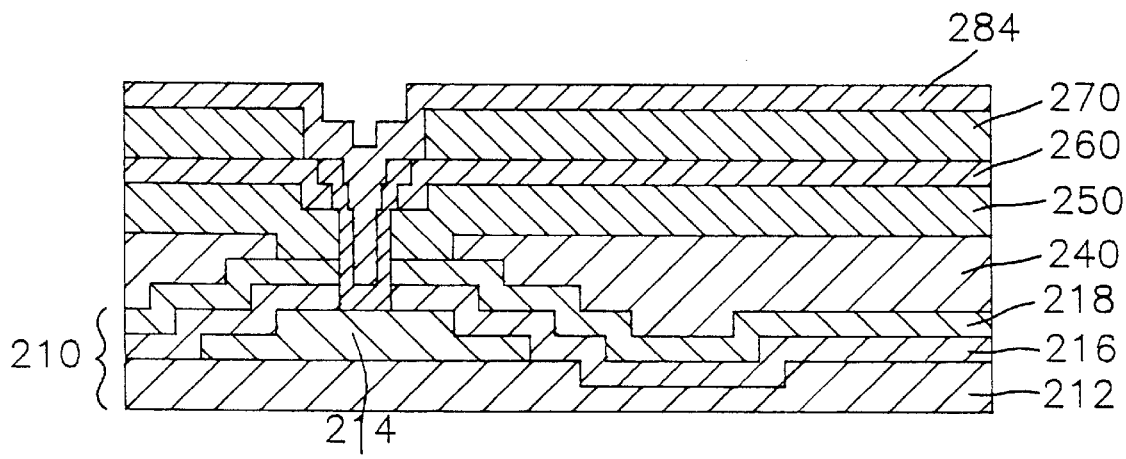
FIGS. 5A to 5D present partial cross sectional views illustrating a method for manufacturing the array of M×N thin film actuated mirrors illustrated in FIG. 4.

In FIG. 5A, the insulating member 284 is formed on top of the conduit 282 and the thin film electrodisplacive layer 270 in each of the actuating structures 320 by using an evaporation, a Sol-Gel, a sputtering or a CVD method, the insulating member completely covering the conduits 282 and the thin electrodisplacive layer 270.

Figure 5B:
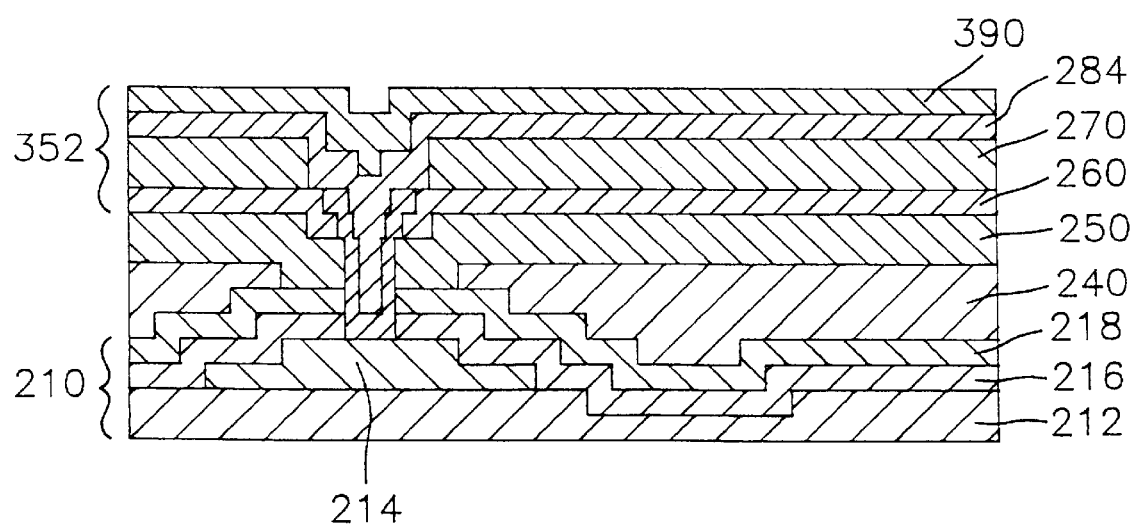

Subsequently, a first thin film layer 390, made of an electrically conducting and light reflecting material, e.g., aluminum(Al) or silver(Ag), and having a thickness of 0.1–2 $\mu$m, is formed on top of the insulating member 284 by using a sputtering or a vacuum evaporation method, thereby forming a multiple layered structure 352, as shown in FIG. 5B.

Figure 5C:
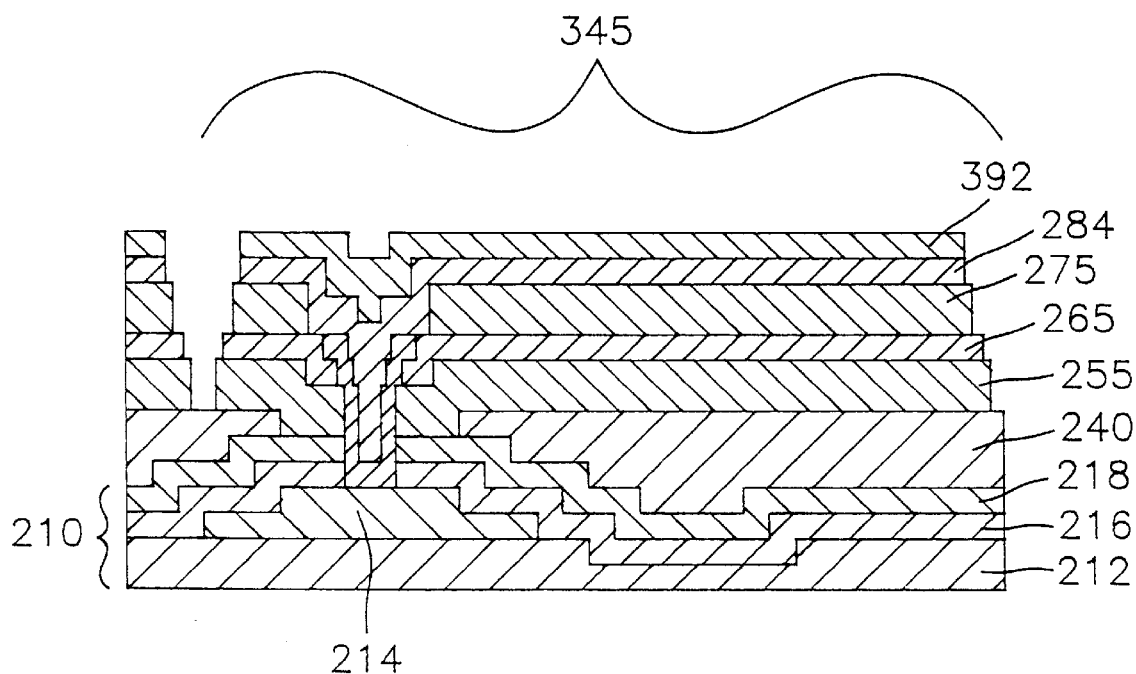

In an ensuing step, as shown in FIG. 5C, the multiple layered structure 352 is patterned into an array of M×N semifinished actuated mirrors 345 by using a photolithography or a laser trimming method, until the thin film sacrificial layer 240 is exposed. Each of the M×N semifinished actuated mirrors 345 includes a first thin film electrode 392, an insulating member 284, a thin film electrodisplacive member 275, the second thin film electrode 265 and an elastic member 255.

Figure 5D:
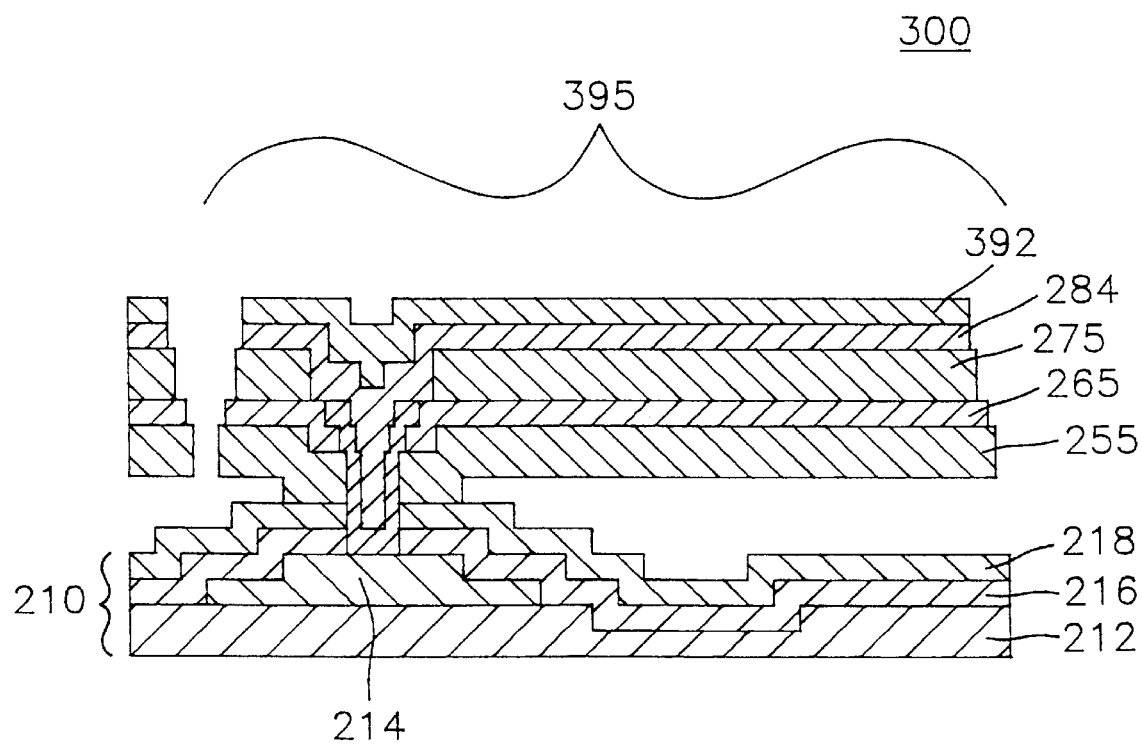

The ensuing steps are similar to those for forming the first embodiment, thereby forming the array 300 of M×N thin film actuated mirrors 395, as shown in FIG. 5D.

In comparison with the prior art array 100 of M×N thin film actuated mirrors 150 and method for the manufacture thereof, in the inventive arrays 200, 300 of M×N thin film actuated mirrors 295, 395 and the methods for the manufactures thereof, a possibility of short-circuit between the first and the second thin film electrodes has been reduced by introducing the insulation member 284 between the conduit 282 and the first thin film electrode 392 in each of the thin film actuated mirrors 395.

It should be mentioned that, even though, the thin film actuated mirrors 295, 395 and the methods for manufacturing thereof are described with respect to the case, wherein each of the thin film actuated mirrors has a unimorph structure, the ideas presented above can be equally well applied to a case wherein each of the thin film actuated mirrors has a bimorph structure, for the latter case just involves an additional electrodisplacive and electrode layers and the formation thereof.

While the present invention has been described with respect to certain preferred embodiments only, other modifications and variations may be made without departing from the spirit and scope of the present invention as set forth in the following claims.

What is claimed is:

1. An array of M×N thin film actuated mirrors, wherein M and N are integers, for use in an optical projection system, the array comprising:

an active matrix; and an array of M×N actuating structures, each of the actuating structures being provided with an elastic member, a bottom portion at a proximal end thereof secured to the active matrix to thereby cantilever the elastic member, a first thin film electrode electrically connected to ground, thereby allowing the first thin film electrode to function as a mirror and a bias electrode, a second thin film electrode electrically connected to the active matrix through a conduit to thereby allow the second thin film electrode to function as a signal electrode, a thin film electrodisplacive member located between the first and the second thin film electrodes, and an insulating member, wherein the insulating member is located between the top of the conduit and the bottom of the first thin film electrode, thereby electrically disconnecting the first and the second thin film electrodes.

2. The array of claim 1, wherein the insulating member is made of a nitride.

3. The array of claim 1, wherein the insulating member is made of an electrodisplacive material.

4. The array of claim 3, wherein the insulating member is in a layer form.

5. The array of claim 4, wherein the insulating member covers top of the conduit and the thin film electrodisplacive member.

* * * * *